July 15, 1924.
L. H. A. DUCASSE
TUBE SCRAPER
Filed July 13, 1920
1,501,759
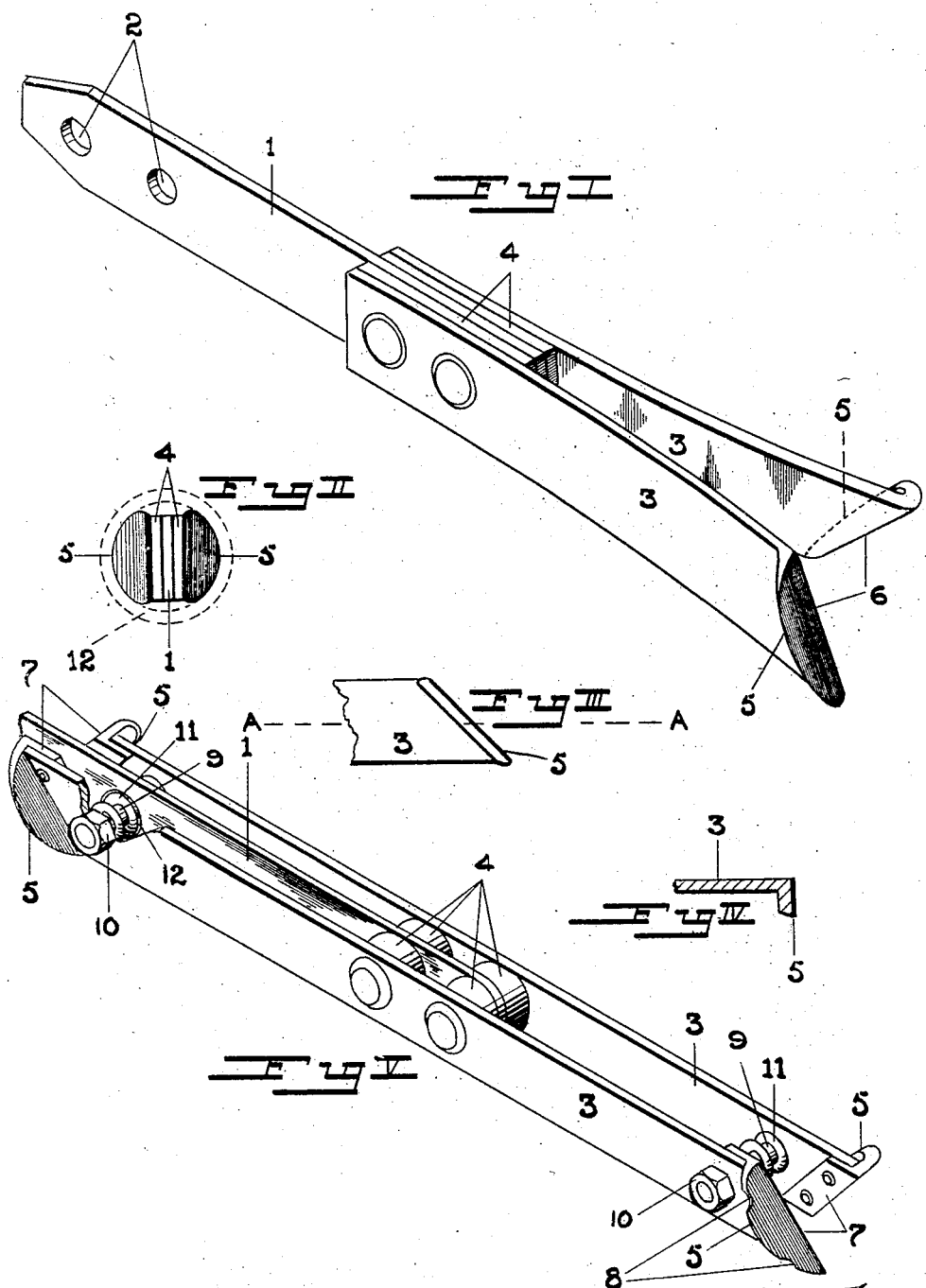

Patented July 15, 1924.

1,501,759

UNITED STATES PATENT OFFICE.

LOUIS HIPPOLYTE AUGUSTE DUCASSE, OF ALEXANDRIA, NATAL, SOUTH AFRICA.

TUBE SCRAPER.

Application filed July 13, 1920. Serial No. 395,945.

*To all whom it may concern:*

Be it known that LOUIS HIPPOLYTE AUGUSTE DUCASSE, a British subject, residing at Renishaw Estate, Alexandria County, Natal Province, of the Union of South Africa, has invented certain new and useful Improvements in Tube Scrapers, of which the following is a specification.

The present invention relates to scrapers for removing incrustation from the interior of the tubes of boilers, evaporators and the like, and is illustrated in the accompanying drawings in which—

Fig. I shows one form of scraper.
Fig. II is an end view of the same.
Fig. III is a side view of a cutting edge.
Fig. IV is a sectional plan on A—A Fig. III.
Fig. V shows another form.

According to the present invention the scraper is formed with arcuate cutting edges disposed angularly to the axis of the tube and arranged to bear against the curved inside surface of the tube. Usually several such cutting edges are provided, and they may be directed oppositely so as to be effective in both directions.

The cutting edges are preferably formed as outwardly directed extensions of longitudinal bars attached to a holder, said parts being resiliently supported from the holder so as to yield to inequalities in the tube.

The scraper is operated by pushing it through the tube, causing the arcuate cutting edges to shear the deposit from the internal surface thereof.

Referring more particularly to the construction shown in Figs. I to IV, 1 indicates a holder formed with bolt holes 2 for attaching it to a long handle. A cutter bar 3 of spring steel is riveted to each side of the holder and spaced therefrom by a distance piece 4. Said cutter bars extend longitudinally of the holder but may diverge somewhat at their free ends to bring the cutting edges into contact with the tube.

The cutting edges 5 are formed by turning out the free end 6 of each cutter bar 3 in a plane transverse and angular to the longitudinal axis of the tube. Said turned out end is shaped to an arc so as to approximately fit against the internal surface of a tube (indicated by dotted lines 12 in Fig. II) of the size for which it is intended. The edge is also bevelled as indicated in Fig. IV.

In use the device is pushed into the tube 12 to be cleaned, when the cutting edges 5 spring into contact with the scale on the interior of the tube. The device is pushed back and forth and also rotated, causing the cutting edges to shear off the scale.

The device described cuts in one direction only. A modification designed to cut in both directions and also adapted for heavier work is shown in Fig. V. In this case each cutter bar 3 is formed at each end with a cutting edge 5, said cutting edges on the same bar being preferably oppositely disposed as shown.

The free ends of the cutter bars 3 are in this case thrust outwards by springs 11 which are compressed between the two bars 3. The holder 1 is perforated at 12 to permit the rear spring 11 to pass freely through it. The springs 11 are mounted upon bolts 9 provided with nuts 10 by which the extent of separation of the bars 3 is limited as desired.

Instead of being integral with the cutter bars 3, as is the case with the Fig. I construction, the cutting edges 5 are shown as formed on separate cutters 7, secured to the cutter bars 3. Some of the cutting edges are serrated or similarly formed as indicated at 8 to facilitate the cutting operation and the clearance of the cuttings.

I claim—

In a tube scraper the combination of a holder, a rectangular cutter bar at each side of and extending substantially longitudinally of same, packing pieces at the centre of each cutter bar adapted to space the cutter bars from the holder, a plurality of cutters mounted on the bars and having arcuate cutting edges, the planes of the cutting edges being inclined to the longitudinal axis of the scraper, and spiral springs supported on spindles fixed at each end of the cutting bars adapted to force the bars outwards.

In testimony whereof I affix my signature.

LOUIS HIPPOLYTE AUGUSTE DUCASSE.

Witnesses:
MARTIN IRONSIDE,
VERA W. CAMELLEY.